W. REINL.
ANTISKID FOR TIRES.
APPLICATION FILED JUNE 6, 1919.
1,349,295.
Patented Aug. 10, 1920.
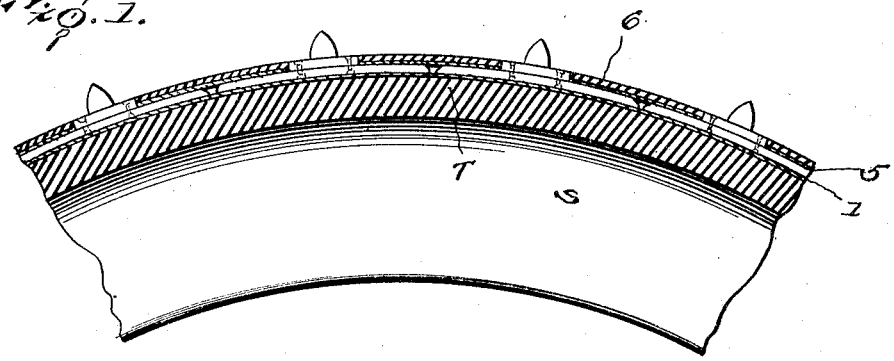
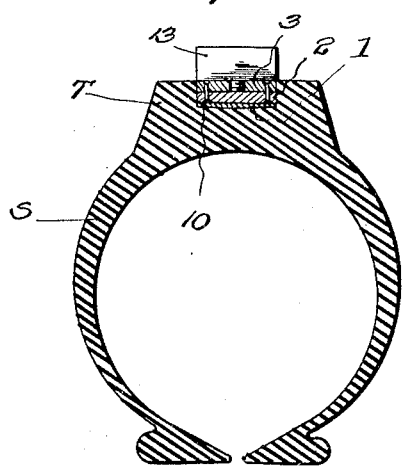
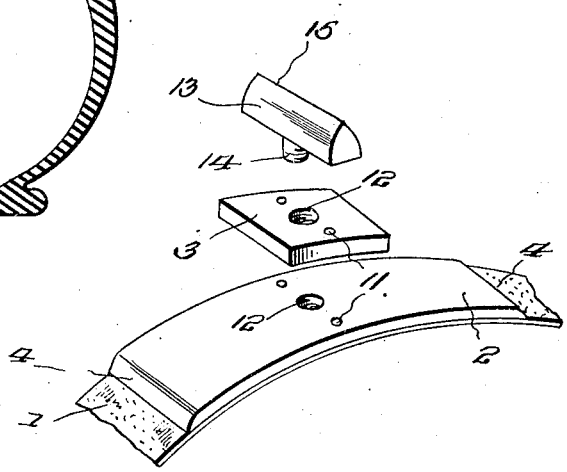
Inventor
William Reinl.
By Lacey & Lacey, Attorneys

UNITED STATES PATENT OFFICE.

WILLIAM REINL, OF SECAUCUS, NEW JERSEY.

ANTISKID FOR TIRES.

1,349,295.  Specification of Letters Patent.  Patented Aug. 10, 1920.

Application filed June 6, 1919. Serial No. 302,275.

*To all whom it may concern:*

Be it known that I, WILLIAM REINL, a citizen of the United States, residing at Secaucus, in the county of Hudson and State of New Jersey, have invented certain new and useful Improvements in Antiskids for Tires, of which the following is a specification.

This invention relates to pneumatic tires, and more especially to anti-slipping devices for the treads thereof; and the object of the same is to produce an anti-skid structure of metal adapted and intended to be formed as a part of the tread of the tire at the time it is made. While said tread is usually part of the shoe of a pneumatic tire, it will be obvious that it might be the tread side of a cushion tire.

The invention consists broadly in a strip of light metal links connected end to end by canvas elements, a series of metal plates mounted one on each link, and highly tempered calks carried by the plates, the heads only of the calks projecting beyond the face of the tread. Details of the preferred manner of forming this device are set forth below.

In the drawings:

Figure 1 is a longitudinal section through a piece of a pneumatic tire shoe whose tread is equipped with this invention, and Fig. 2 is a cross section through the same.

Fig. 3 is a collective perspective detail of the several parts disconnected.

Although the device might be applied to a cushion tire, it is shown herein as molded into and forming part of the tread T of the shoe S of a pneumatic tire, and for sake of illustration although the construction is quite common, the tread is shown as an integral part of the shoe and as projecting a considerable distance beyond the outside of the shoe or casing itself. Into the increased thickness of material thus formed is inserted the anti-skid device constituting the subject matter of the present invention, and manifestly this will be done at the time the shoe is made or perhaps when it is retreaded.

The numeral 1 designates a band as of friction canvas or like fabric or flexible material extending entirely around the shoe. Next overlying this band are short sections or links 2 of light sheet metal, preferably aluminum a little over an inch wide and substantially four inches long. Over the mid-length of each link is a metal plate 3 about one and one-fourth inches square and preferably of the same material. The ends of the links are rounded slightly as at 4, and lapping and breaking joint with these ends are strips 5 of the same material as the band 1 but of less thickness than the plates 3. The band and the strips are secured to the inner and outer faces of the links respectively by first thoroughly cleaning the links and then cementing the fabric thereon by any well known adhesive preferably furniture glue applied hot, and thereby is produced a belt of a size to encircle the tire shoe being made and whereof each link 2 is struck on the proper curve, and in the finished article this belt is embedded into the tread T as seen in Fig. 2 so that some of the rubber closes over and is vulcanized above the ends of the links as at 6, but by preference does not cover the plates 3.

It is possible to make each plate integral with its links, but as that might impair the flexibility thereof, it is preferred to rivet these elements together as indicated at 10, and two rivets will be sufficient, passing through alined holes 11 disposed transversely of the plate and the link at their mid-length. Also these elements have larger and centrally alined sockets or holes 12 threaded as shown. Finally a calk is provided made by preference of steel highly tempered so as to resist wear. This calk comprises a head 13 of appropriate shape and preferably of a length to extend completely across the plate 3, and an integral threaded stud 14 depending from the flat lower side of the head and adapted to be screwed into the hole 12. Said lower side forms the base of the calk which rests squarely on the face of the plate, while the outer side of the head is given an active edge 15 of any appropriate shape to embed the road or pavement or to cut into ice so as to prevent slipping.

Changes in details are possible. The stud in Fig. 2 is shown as passing only through the plate, whereas in Fig. 3 both the plate and the link are provided with sockets and the stud is long enough to pass through them against the inner canvas band 1. In any case the stud should be threaded clear up to the base of the head so that it will screw down tightly on to the plate. It has been suggested that the plate might be integral with the link. When made separate as shown, the rivets 10 may not be necessary if the stud passes through the plate into the link, and in that event pin-and-socket connection or other means might be employed to prevent turning of the plate on the link, even while the stud holds them connected. All corners contacting with fabric or rubber may be rounded instead of only the end corners at 4, so that the manipulation of parts in use will not cause wear. Finally, other means than the threaded stud and hole shown and described may be employed for mounting the tempered calk on the belt element which is embedded in the tread. All of which possible modifications are to be considered in the light of the subjoined claim.

Having thus described the invention, what is claimed as new is:

The combination with a tire tread, of a fabric band extending longitudinally of the tire tread midway the sides thereof, metal links cemented longitudinally upon the outer face of the band end to end, the ends of the links being beveled, metal plates secured upon the outer faces of the respective links between the ends thereof, fabric strips cemented longitudinally on the outer faces of the links across the meeting ends thereof from plate to plate, said strips being approximately of the same width as the links and of less thickness than the plates and the tire tread being vulcanized about and over the band, the links and the strips with the faces of the plates flush with the face of the tread, and calks carried by and projecting from the plates and the links.

In testimony whereof I affix my signature.

WILLIAM REINL. [L. S.]